US011600890B2

(12) United States Patent
Vernon et al.

(10) Patent No.: US 11,600,890 B2
(45) Date of Patent: Mar. 7, 2023

(54) BATTERY PACK ASSEMBLIES HAVING TERMINAL CONNECTOR MECHANISMS AND VEHICLES HAVING THE SAME

(71) Applicant: Toyota Motor Engineering & Manufacturing North America, Inc., Plano, TX (US)

(72) Inventors: Nicholas S. Vernon, Brighton, MI (US); Joshua D. Yaksich, Jackson, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 311 days.

(21) Appl. No.: 16/871,784

(22) Filed: May 11, 2020

(65) Prior Publication Data

US 2021/0351390 A1    Nov. 11, 2021

(51) Int. Cl.
*H01M 50/502*     (2021.01)
*H01R 13/08*     (2006.01)
(Continued)

(52) U.S. Cl.
CPC ......... *H01M 50/502* (2021.01); *H01M 50/20* (2021.01); *H01M 50/543* (2021.01);
(Continued)

(58) Field of Classification Search
CPC .. H01M 50/502; H01M 50/543; H01M 50/20; H01M 2220/20; H01R 2201/26;
(Continued)

(56) References Cited

U.S. PATENT DOCUMENTS 4,429,944 A    2/1984  Bell
8,574,008 B2 *  11/2013  Große ................. H01M 50/571
439/627
(Continued)

FOREIGN PATENT DOCUMENTS

CN    201515029 U    6/2010
DE    102018109545 A1    10/2019
(Continued)

*Primary Examiner* — Oscar C Jimenez
*Assistant Examiner* — Paul D Baillargeon
(74) *Attorney, Agent, or Firm* — Dinsmore & Shohl LLP

(57) ABSTRACT

A battery pack assembly includes at least one battery cell and a terminal connector mechanism. The at least one battery cell has at least one terminal which includes a terminal engagement portion. The terminal connector mechanism has a retention member and a biasing member. The retention member has retention portion and is configured to move between an engaged position and a disengaged position. The biasing member is positioned between the housing and the retention member to bias the retention member towards the engaged position. In the engaged position, the retention portion of the retention member engages with the terminal engagement portion to inhibit movement of the terminal connector mechanism. In the disengaged position, the retention portion of the retention member is disengaged from the terminal engagement portion to permit movement of the terminal connector mechanism.

18 Claims, 6 Drawing Sheets

(51) Int. Cl.
*H01R 13/50* (2006.01)
*H01R 31/00* (2006.01)
*H01M 50/20* (2021.01)
*H01M 50/543* (2021.01)

(52) U.S. Cl.
CPC ............ *H01R 13/08* (2013.01); *H01R 13/50* (2013.01); *H01R 31/00* (2013.01); *H01M 2220/20* (2013.01); *H01R 2201/26* (2013.01)

(58) Field of Classification Search
CPC .......... H01R 13/08; H01R 31/00; H01R 4/28; H01R 4/48; H01R 4/4854; H01R 4/4863
See application file for complete search history.

(56) References Cited

U.S. PATENT DOCUMENTS

| | | |
|---|---|---|
| 9,437,860 B2 | 9/2016 | Farha |
| 9,553,295 B2* | 1/2017 | Kim .................... H01M 50/553 |
| 9,985,267 B2 | 5/2018 | Gunther et al. |
| 2007/0026306 A1* | 2/2007 | Lee .................... H01M 50/502 |
| | | 429/178 |

FOREIGN PATENT DOCUMENTS

| | | |
|---|---|---|
| JP | 5549401 B2 | 7/2014 |
| JP | 2017195056 A | 10/2017 |
| WO | 2012110270 A1 | 8/2012 |

* cited by examiner

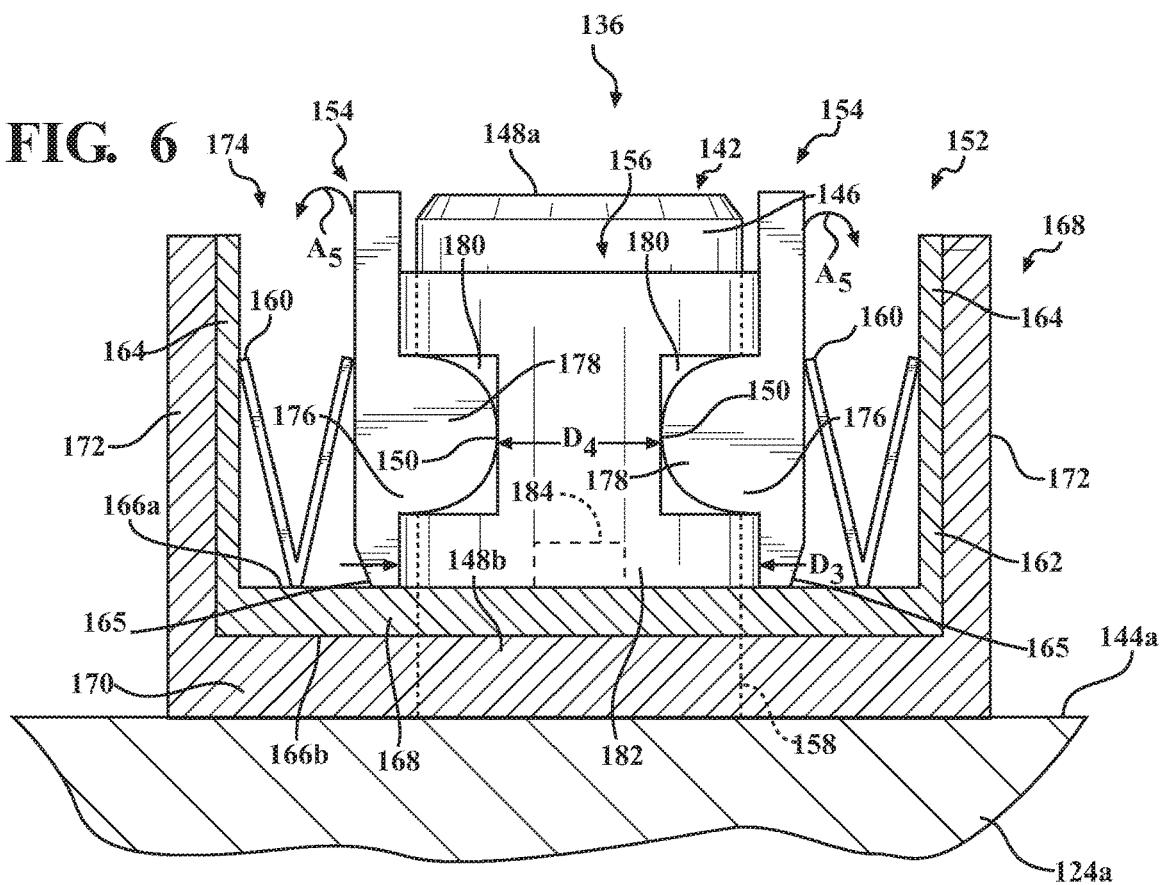
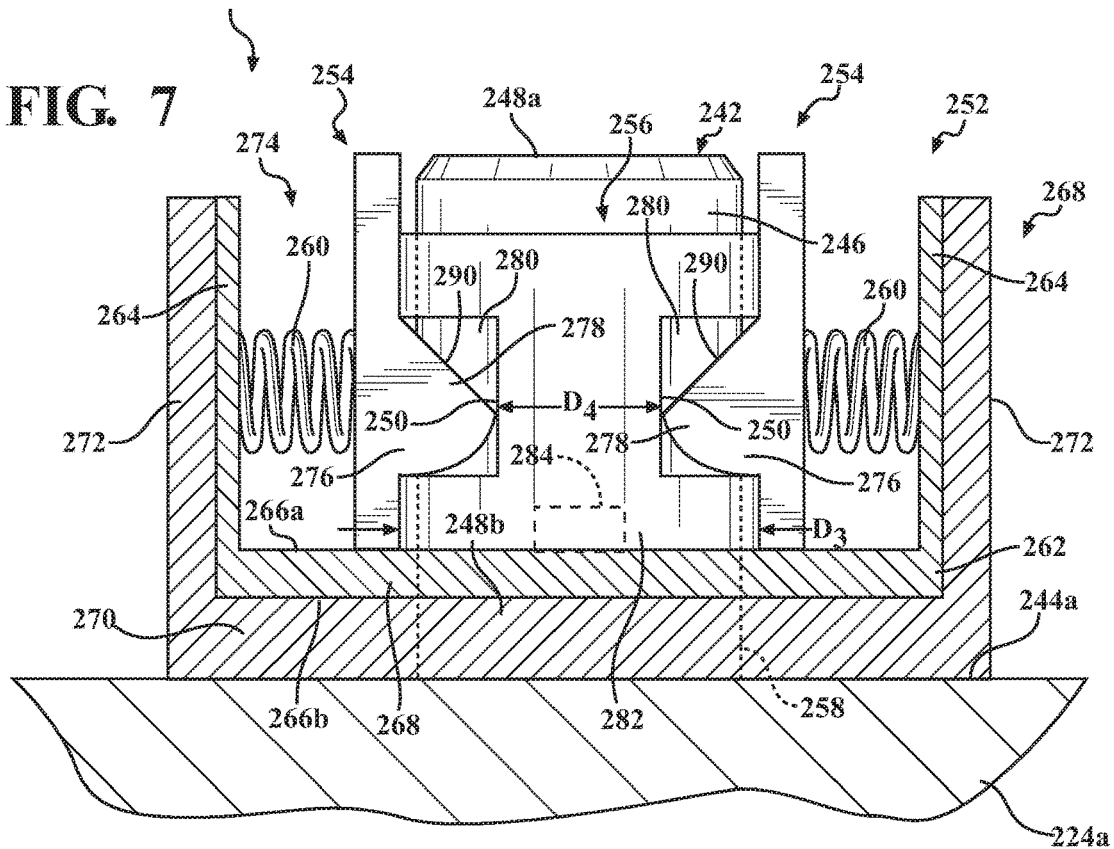

BATTERY PACK ASSEMBLIES HAVING TERMINAL CONNECTOR MECHANISMS AND VEHICLES HAVING THE SAME

TECHNICAL FIELD

The present specification generally relates to battery pack assemblies and, more specifically, to battery packs having a retention member moveable between an engaged position and disengaged position.

BACKGROUND

Hybrid electric vehicles include battery packs, which may include a stack of battery cells and a bus bar module provided on top of the stack of battery cells. The bus bar module is generally configured to carry a voltage and current to a component of the vehicle (e.g., a powertrain component of the vehicle). Each of the plurality of cells may include a pair of externally threaded terminals, and the bus bar module may include a plurality of housings that each includes a terminal plate for connecting to the terminals of the cells and a bus bar. The terminal plates of the bus bar module are secured to the externally threaded terminals of the plurality of cells by nuts. To gain access to the individual battery cell, all of the nuts along the length of the bus bar module must be removed in order to remove the bus bar module.

Accordingly, a need exists for a device that enables quick access to each battery cell within the battery pack while providing voltage and current from the battery pack to a component of the vehicle.

SUMMARY

In one embodiment, a battery pack assembly is provided. The battery pack assembly includes at least one battery cell and a terminal connector mechanism. The at least one battery cell has at least one terminal. The at least one terminal has a terminal engagement portion. The terminal connector mechanism has a housing, a retention member and a biasing member. The retention member has a retention portion. The retention member is configured to move between an engaged position and a disengaged position. The biasing member is positioned between the housing and the retention member to bias the retention member towards the engaged position. In the engaged position, the retention portion of the retention member engages with the terminal engagement portion to inhibit movement of the terminal connector mechanism with respect to the at least one terminal in an insertion direction. In the disengaged position, the retention portion of the retention member is disengaged from the terminal engagement portion to permit movement of the terminal connector mechanism with respect to the at least one terminal in the insertion direction.

In another embodiment, a vehicle is provided. The vehicle includes at least one battery cell and a terminal connector mechanism. The at least one battery cell has at least one terminal. The at least one terminal has a terminal engagement portion. The terminal connector mechanism has a housing, a retention member and a biasing member. The retention member has a retention portion. The retention member is configured to move between an engaged position and a disengaged position. The biasing member is positioned between the housing and the retention member to bias the retention member towards the engaged position. In the engaged position, the retention portion of the retention member engages with the terminal engagement portion to inhibit movement of the terminal connector mechanism with respect to the at least one terminal in an insertion direction. In the disengaged position, the retention portion of the retention member is disengaged from the terminal engagement portion to permit movement of the terminal connector mechanism with respect to the at least one terminal in the insertion direction.

In yet another embodiment, a method of removing an individual battery cell from a battery pack having a plurality of battery cells in which each battery cell has at least one terminal is provided. The method includes displacing a first retention member towards a first sidewall and a second retention member towards a second sidewall of a terminal connector mechanism to disengage a protrusion of a retention portion of each of the first and second retention members from a terminal engagement portion of the at least one terminal, removing the terminal connector mechanism from the battery pack in a first direction, and removing the individual battery cell from the battery pack in the first direction.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6 schematically depicts an isolated cross-sectional view of one of a second example plurality of terminal connector mechanisms of the battery pack assembly of FIG. 1 in an engaged position according to one or more embodiments described herein; and FIG. 7 schematically depicts an isolated cross-sectional view of one of a third example plurality of terminal connector mechanisms of the battery pack assembly of FIG. 1 in an engaged position according to one or more embodiments described herein.

DETAILED DESCRIPTION

Embodiments described herein generally relate to a battery pack assembly. The battery pack assembly includes a plurality of battery cells and a pair of terminal connector mechanisms. Each battery cell has a terminal side and an opposite floor side. A pair of terminals extend from each of the plurality of battery cells on the terminal side. The pair of terminals of each of the plurality of battery cells are provided with a post that extends upwardly from a terminal surface of each of the plurality of battery cells on the terminal side. A pair of cutouts extend inwardly between a distal end and a proximate end of the post. The pair of terminal connector mechanisms extend across a length of the battery pack.

Each one of the pair of terminal connector mechanisms include a housing, a retention member that has a retention portion, and a biasing member. The retention member is configured to move between an engaged position and a disengaged position. The biasing member is positioned between the housing and the retention member to bias the retention member towards the engaged position. In the engaged position, the retention portion of the retention member engages with the terminal engagement portion to inhibit movement of the terminal connector mechanism with respect to the at least one terminal in an insertion direction. In the disengaged position, the retention portion of the retention member is disengaged from the terminal engagement portion to permit movement of the terminal connector mechanism with respect to the at least one terminal in the insertion direction.

One of the terminal engagement portion and the retention portion is formed as a shaped recess and the other of the terminal engagement portion and the retention portion is formed as a shaped protrusion that has a shape that corresponds to the shape of the shaped recess. In the engaged position, the retention portion of the retention member extends through the cutout of the terminal receiver to engage with the terminal engagement portion.

As used herein, the term "communicatively coupled" means that coupled components are capable of exchanging data signals with one another such as, for example, electrical signals via a conductive medium or a non-conductive medium, and the like.

Figure 1:
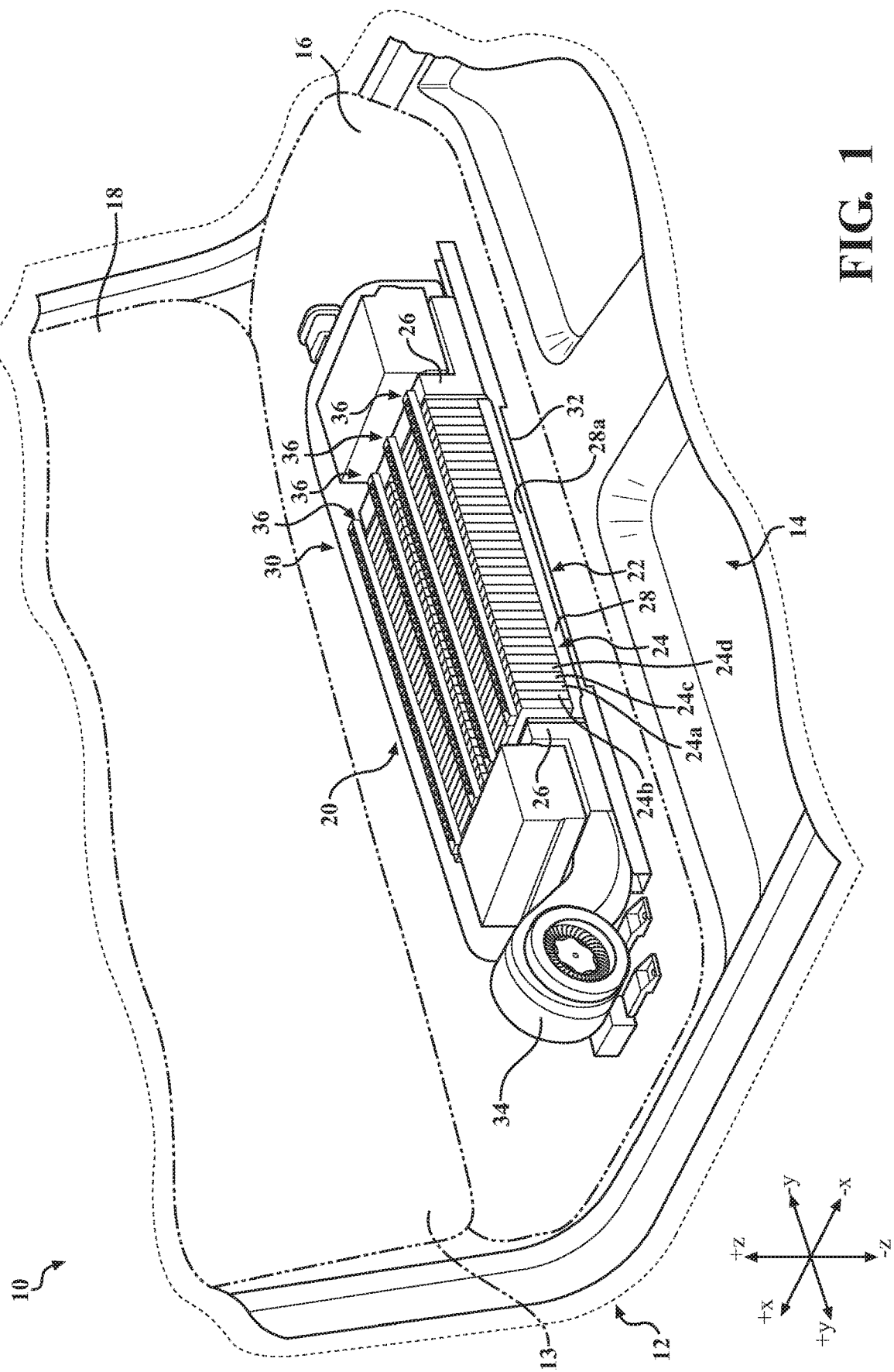
FIG. 1 schematically depicts a partial perspective view of a vehicle and a battery pack assembly according to one or more embodiments shown or described herein.

As used herein, the term "longitudinal direction" refers to the forward-rearward direction of the battery pack (i.e., in the +/−Y-direction depicted in FIG. 1). The term "lateral direction" refers to the cross-direction of the battery pack (i.e., in the +/−X-direction depicted in FIG. 1), and is transverse to the longitudinal direction. The term "vertical direction" or "up" or "above" refer to the upward-downward direction of the battery pack (i.e., in the +/−Z-direction depicted in FIG. 1).

Vehicles that incorporate elements according to the present disclosure may include a variety of battery pack assemblies that are conventionally known, including battery pack assemblies that are used in marine applications such as within boats, aerospace applications such as within airplanes, and/or in vehicle applications, such as cars, trucks, sport utility vehicles, and the like. It should be appreciated that the vehicle may be a hybrid vehicle, an electric vehicle, a conventional vehicle, and the like. Further, battery pack assemblies may be used in home applications, such as tools, appliances, and the like.

Figure 2:
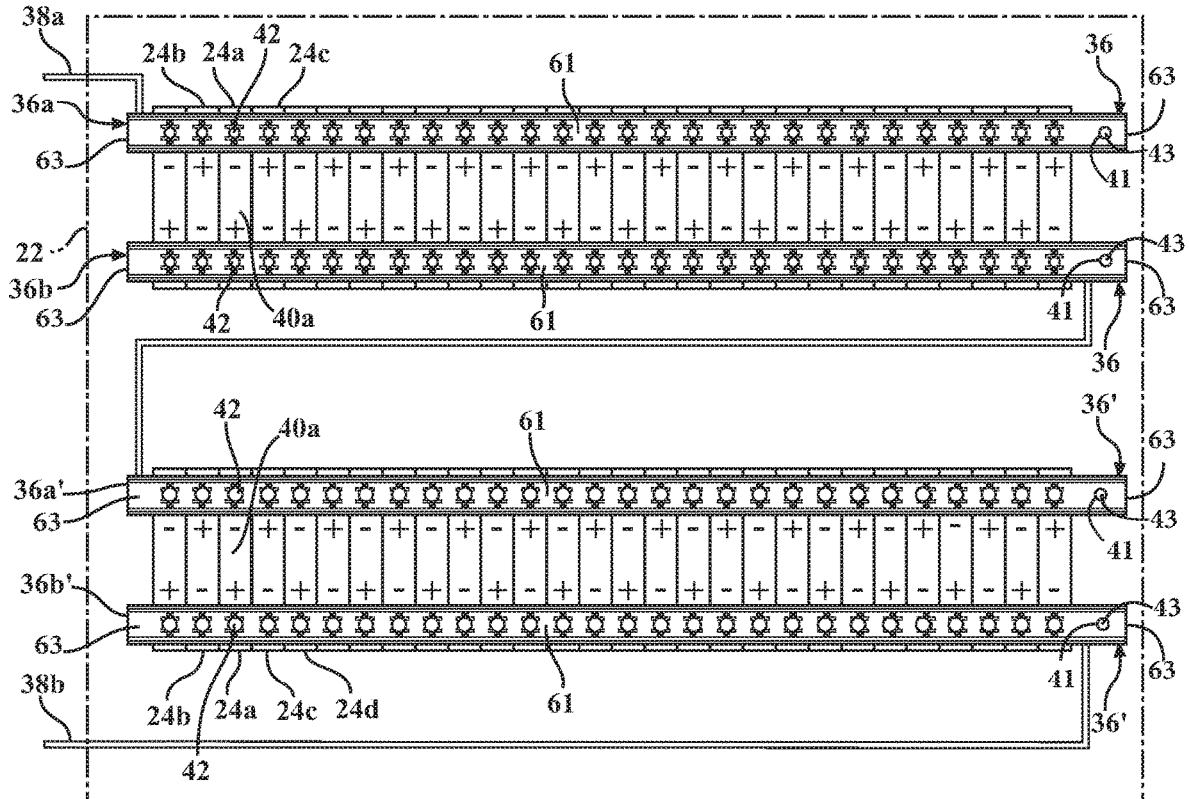
FIG. 2 schematically depicts a top view of the battery pack assembly of FIG. 1, with a first example plurality of terminal connector mechanisms in an engaged position according to one or more embodiments shown or described herein.
Figure 3:
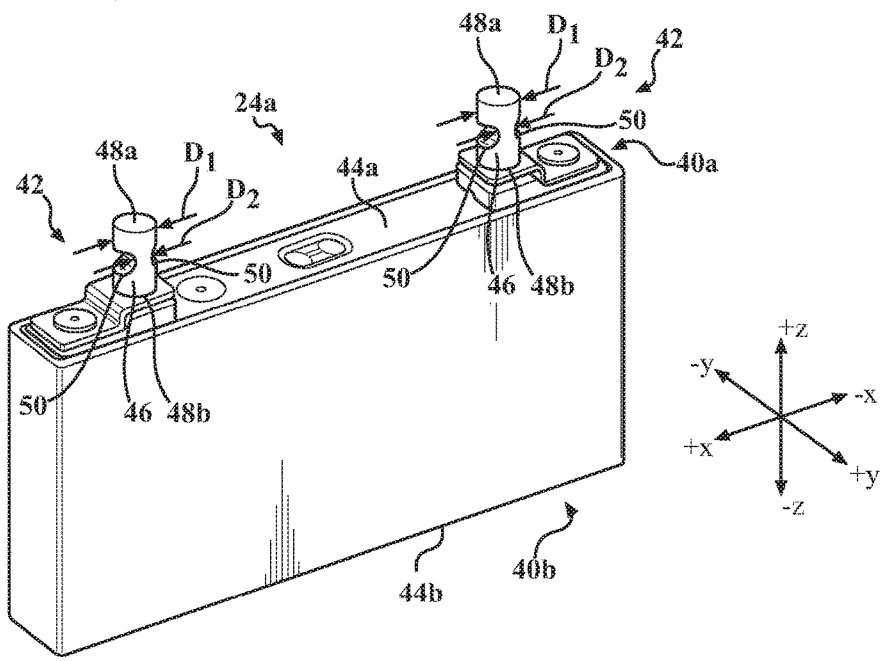
FIG. 3 schematically depicts an isolated perspective view of a battery cell of the battery pack assembly of FIG. 1 according to one or more embodiments described herein.

Referring to FIGS. 1-3, a vehicle 10 including a passenger compartment 12 is shown. The passenger compartment 12 includes a seat 13 and a seat frame 14. The seat frame 14 incudes a seat portion 16 and a seat back portion 18. In some embodiments, a battery pack assembly 20 has a plurality of battery cells 24 and is positioned within or mounted below the seat portion 16 of the seat frame 14. It should be appreciated that the plurality of battery cells 24 includes a plurality of individual battery cells 24a. It should also be appreciated that the battery pack assembly 20 may be positioned anywhere within the passenger compartment 12, an engine compartment, a storage compartment, such as a trunk or a truck bed, and the like, within the vehicle 10. It is also appreciated that the battery pack assembly 20 may be positioned within or mounted to a frame of the vehicle 10.

The battery pack assembly 20 includes a housing 22 that houses a plurality of battery cells 24. It should be appreciated that the plurality of battery cells 24 are illustrated as being in two rows in the lateral direction (i.e. in the +/−Y direction), this is non-limiting and the plurality of battery cells 24 may be positioned within the housing 22 in a plurality of configurations and arrangements. For instance, the plurality of battery cells 24 may be positioned within the housing 22 in a column configuration, or in the longitudinal direction (i.e., in the +/−X direction).

The housing 22 includes a pair of end retaining walls 26 and a pair of side retaining walls 28 that define a housing interior portion 30 that includes a floor surface 32. In some embodiments, the end retaining walls 26 and the side retaining walls 28 each extend in a vertical direction (i.e., in the +/−Z direction). Further, in some embodiments, the end retaining walls 26 each extend in the vertical direction (i.e., in the +/−Z direction) a greater distance than the side retaining walls 28. The side retaining walls 28 further include an outer surface 28a that is positioned outside of each of the plurality of battery cells 24 positioned within the housing interior portion 30 of the housing 22.

In some embodiments, the battery pack assembly 20 may include a cooling mechanism 34. The cooling mechanism 34 forces airflow above and/or beneath each battery cell 24a of the plurality of battery cells 24 to cool the plurality of battery cells 24.

Referring to FIGS. 1 and 2, the battery pack assembly 20 further includes a pair of terminal connector mechanisms 36 extending across a length of the plurality of battery cells 24 in the lateral direction (i.e., in the +/−Y direction). It should be appreciated that the pair of terminal connector mechanisms 36 extend in a direction transverse to the plurality of battery cells 24. As a non-limiting example, in the column configuration, the pair of terminal connector mechanisms 36 extend in the longitudinal direction (i.e., in the +/−X direction). As another non-limiting example, when the plurality of battery cells 24 are arranged in a row configuration, as shown in FIG. 1, the pair of terminal connector mechanisms 36 extend in the lateral direction (i.e., in the +/−Y direction).

The pair of terminal connector mechanisms 36 assist in retaining the plurality of battery cells 24 within the housing 22. Further, each of the pair of terminal connector mechanisms 36 provide a conductive medium such that an energy stored in of each of the plurality of battery cells 24 may be carried through the each of the pair of terminal connector mechanisms 36 to a different component of the vehicle 10, such as a powertrain, an inverter, and the like, as discussed in greater detail herein.

Each of the plurality of battery cells 24 are communicatively coupled in series with each other. It should be understood that each row is communicatively coupled to other rows such that each battery cell 24a of the plurality of battery cells 24 are communicatively coupled in series. As such, adjacent battery cells 24b, 24c of the plurality of battery cells 24 are positioned or arranged such that the polarity of the adjacent battery cells 24b, 24c is reversed compared to the adjacent battery cell 24b. That is, in a non-limiting example, the battery cell 24a is arranged within the housing 22 with a positive terminal nearest to the outer surface 28a of the side retaining walls 28 of the housing 22 while a negative terminal is nearest to the housing interior portion 30 of the housing 22. The adjacent battery cells 24b, 24c are each arranged within the housing 22 with a positive terminal nearest to the housing interior portion 30 of the housing 22 while a negative terminal is nearest to the outer surface 28a of the side retaining walls 28 of the housing 22. As such, it is understood that the positive terminal of each of the plurality of battery cells 24 alternates such that every other battery cell has the same positive terminal polarity arrangement, and the same applies for each negative terminal of the plurality of battery cells 24.

A pair of load wires 38a, 38b are communicatively coupled to the plurality of battery cells 24 through the pair of terminal connector mechanisms 36 such that an energy stored within the plurality of battery cells 24 may be transferred from the plurality of battery cells 24 to another component of the vehicle 10 via the pair of terminal connector mechanisms 36 and the pair of load wires 38a, 38b. It should be understood that the energy stored and/or transferred may be a voltage, a current, a power, and the like. It should be appreciated that the pair of load wires 38a, 38b may be a bus bar, a wire, or other conductive medium that transfers the energy stored within the plurality of battery cells 24 to the components of the vehicle 10. In some embodiments, the component of the vehicle 10 may be a powertrain component. In other embodiments, the vehicle component is an inverter, a relay, fuses, other electrical components, and the like.

Referring now to FIG. 3, an isolated view of the battery cell 24a of the plurality of battery cells 24 is schematically depicted. It should be understood that while only the battery cell 24a of the plurality of battery cells 24 is described, the features apply to each battery cell of the plurality of battery cells 24. The battery cell 24a includes a terminal side 40a and an opposite housing side 40b. Further, the battery cell 24a includes a terminal surface 44a on the terminal side 40a and a housing surface 44b that, in some embodiments, abuts the floor surface 32 of the housing 22. In other embodiments, the housing surface 44b is adjacent to the floor surface 32 of the housing 22. As such, in this embodiment, the battery cell 24a may not be in contact with the floor surface 32 of the housing 22. In other embodiments, portions of the housing surface 44b are in contact with portions of the floor surface 32 of the housing 22.

In some embodiments, a pair of terminals 42 extends from the terminal surface 44a of the battery cell 24a on the terminal side 40a. One of the pair of terminals 42 is generally known as a positive terminal, and the other terminal of the pair of terminals 42 is generally known as a negative terminal. The pair of terminals 42 are each provided with a post 46 that extends upwardly from the terminal surface 44a of the battery cell 24a in the vertical direction (i.e., in the +/−Z direction). In some embodiments, the post 46 may be cylindrical and has a post diameter D1. In other embodiments, the post 46 may be a square, a rectangle, an octagon, and the like. As such, it should be appreciated that the post 46 may be a uniform shape or a non-uniform shape. Further, in some embodiments, each post 46 of the pair of terminals 42 extends an equal length from the terminal surface 44a in the vertical direction (i.e., in the +/−Z direction). In other embodiments, one post 46 of the pair of terminals 42 extends from the terminal surface 44a in the vertical direction (i.e., in the +/−Z direction), a different height that the other post 46 of the pair of terminals 42. As a non-limiting example, each negative post may extend a height greater than the positive posts in the vertical direction (i.e., in the +/−Z direction). In other embodiments, each positive post may extend a height greater than the negative posts in the vertical direction (i.e., in the +/−Z direction).

Furthermore, in various embodiments, some battery cells of the plurality of battery cells 24 may extend a height greater than the other battery cells of the plurality of battery cells 24 in the vertical direction (i.e., in the +/−Z direction). As a non-limiting example, one row of battery cells of the plurality of battery cells 24 may be at a height greater than the other battery cells of the plurality of battery cells 24 in other rows in the vertical direction (i.e., in the +/−Z direction). In other embodiments, some battery cells within a row in the lateral direction (i.e., in the +/−Y direction) may also be at a height greater than the other battery cells in the same row in the vertical direction (i.e., in the +/−Z direction). As a non-limiting example, every other battery cell may be at a height greater than the adjacent battery cell in the vertical direction (i.e., in the +/−Z direction). It should be understood that the above are non-limiting examples and that each battery cell of the plurality of battery cells 24 may be in any configuration in any direction, such as angled, in varying heights, and the like.

Still referring to FIG. 3, each post 46 of the pair of terminals 42 includes a distal end 48a and a proximate end 48b. The proximate end 48b abuts the terminal surface 44a. The distal end 48a is opposite the proximate end 48b. A pair of terminal engagement portions 50 are positioned on opposite sides of the post 46 between the distal end 48a and the proximate end 48b and extend inward. In some embodiments, the terminal connection portion is an elongated recess that extends generally normal to a longitudinal direction of the post 46 of the terminal 42. In other embodiments, each of the pair of terminal engagement portions 50 are generally semicircular recesses. In other embodiments, one or both of the pair of terminal engagement portions 50 are generally square recesses, rectangular recesses, hexagonal recesses, recesses that are angled with a ramp surface, a combination thereof, and the like. As such, it should be appreciated that the pair of terminal engagement portions 50 may be a uniform shape or a non-uniform shape. It should also be appreciated that the pair of terminal engagement portions 50 reduce the post diameter D1 to a recess diameter D2, which is less than the post diameter D1.

Further, it should be understood that at least portions of each post 46 of the pair of terminals 42 including each of the pair of terminal engagement portions 50 are conductive to provide a path for transmitting the energy stored within each of the plurality of battery cells 24 to the pair of load wires 38a, 38b for use by components of the vehicle 10, as discussed in greater detail herein.

The size and shape of the battery cell 24a may depend on predetermined specifics such as the amount of energy to be stored, a temperature response of the battery cell, an amount of energy the vehicle requires, and the like. As such, the type of the battery cell 24a may vary. In some embodiments, the battery cell 24a is lithium ion (LI-Ion). In other embodiments, the battery cell 24a is a Molten Salt (Na—NiCl2), a Nickel Metal Hydride (Ni-MH), a Lithium Sulphur (Li—S), and the like.

Figure 4:
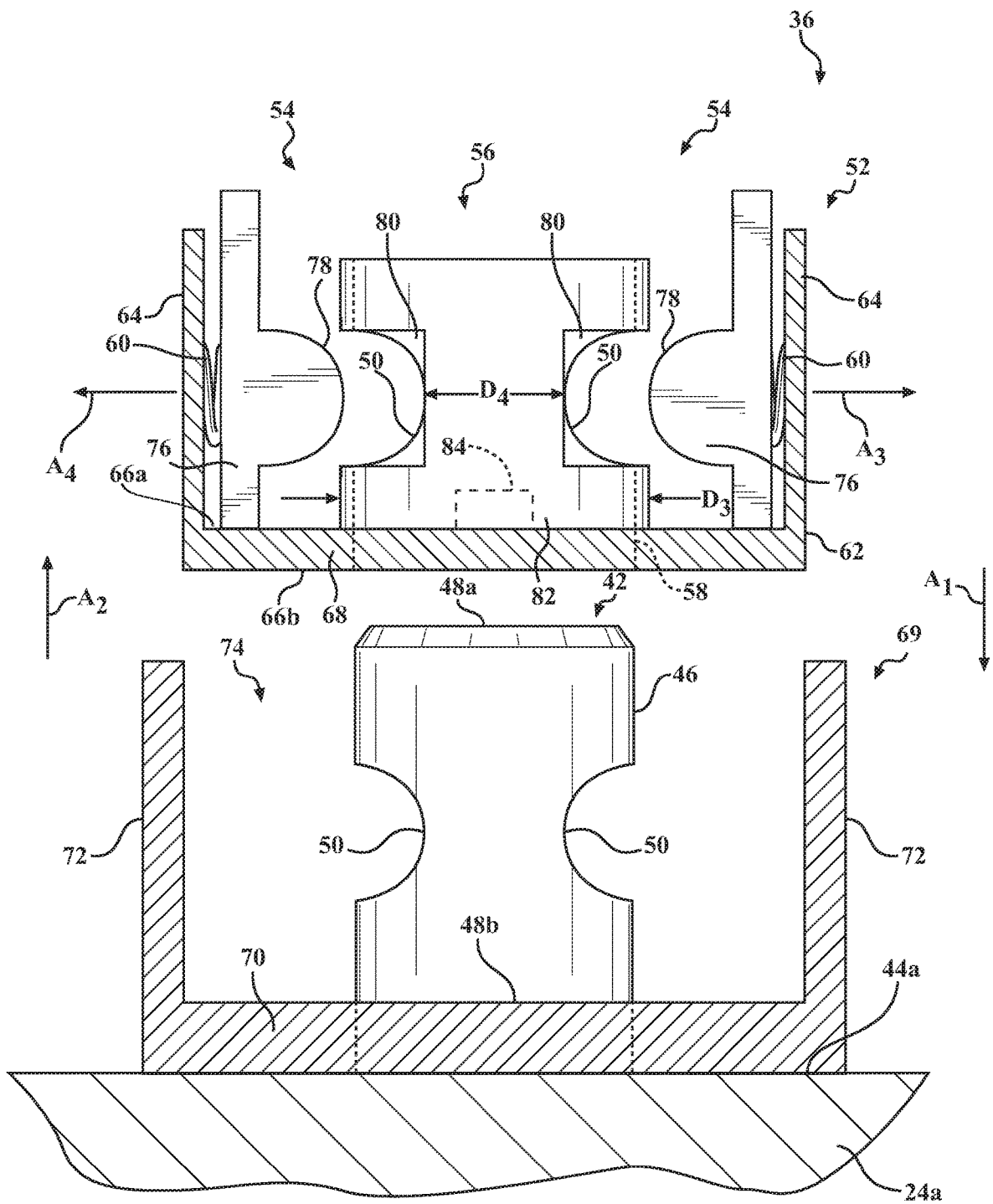
FIG. 4 schematically depicts an isolated cross-sectional view of one of the first examples of a plurality of terminal connector mechanisms of the battery pack assembly of FIG. 1 with the one of the first example plurality of terminal connector mechanisms in a disconnected state according to one or more embodiments described herein.

Referring to FIGS. 1-2 and 4-5 the pair of terminal connector mechanisms 36 will now be described. Each pair of terminal connector mechanisms 36 includes a first terminal connector mechanism 36a and a second terminal connector mechanism 36b. As described in greater detail below, the first terminal connector mechanism 36a and the second terminal connector mechanism 36b are moveable between an engaged position, as shown in FIGS. 1, 2 and 3, and a disengaged position, as shown in FIG. 4. The first terminal connector mechanism 36a and the second terminal connector mechanism 36b each have a pair of end portions 63 and a middle portion 61 disposed between the pair of end portions 63.

Each row of the plurality of battery cells 24 includes the pair of terminal connector mechanisms 36. In some embodiments, each row of terminals 42 includes the pair of terminal connector mechanisms 36, specifically, the first terminal connector mechanism 36a and the second terminal connector mechanism 36b. As such, each row of the plurality of battery cells 24 includes the first terminal connector mechanism 36a and the second terminal connector mechanism 36b. In some embodiments, the pair of terminal connector mechanisms 36 are referred to as the first terminal connector mechanism 36a and the second terminal connector mechanism 36b, and the second pair of terminal connector mechanisms 36' are referred to as a third terminal connector mechanism 36a' and a fourth terminal connector mechanism 36b'. As the structure of the first pair of terminal connector mechanisms 36 corresponds to the second pair of terminal connector mechanisms 36', discussion will be limited to the first pair of terminal connector mechanisms 36, which may also be referred to as a terminal connector mechanism 36.

In some embodiments, at least one of the pair of end portions 63 of the terminal connector mechanism 36 may include an opening 41. A fastener 43 such as a bolt, a screw, a rivet, and the like, may extend through the opening 41 in the terminal connector mechanism 36 and into a bore within the end retaining walls 26 and/or the side retaining walls 28 of the housing 22 such that the terminal connector mechanism 36 is in a locked position. In the locked positon, the terminal connector mechanism 36 inhibits the removal of the plurality of battery cells 24 from the housing 22 and assist in retaining the plurality of battery cells 24 within the housing 22. In some embodiments, the opening 41 and the fastener 43 may be positioned on one side of the pair of end portions 63 of the terminal connector mechanism 36, on both sides of the pair of end portions 63, staggered between the pair of end portions 63, and/or the like. When the fastener 43 is removed from the opening 41, the terminal connector mechanism 36 is in an unlocked position such that access may be provided to the plurality of battery cells 24 within the housing 22.

The terminal connector mechanism 36 extends along the terminal side 40a of the plurality of battery cells 24 in a direction, or pattern, transverse to the pair of terminals 42 of each battery cell 24a of the plurality of battery cells 24. That is, in some embodiments, when the pair of terminals 42 are arranged along the terminal surface 44a in the lateral direction (i.e., in the +/−Y direction) as illustrated, the terminal connector mechanism 36 extends in the longitudinal direction (i.e., in the +/−X direction). In other embodiments, when the pair of terminals 42 are arranged along the terminal surface 44a in the longitudinal direction, (i.e., in the +/−X direction), the terminal connector mechanism 36 extends in the lateral direction (i.e., in the +/−Y direction).

Figure 5:
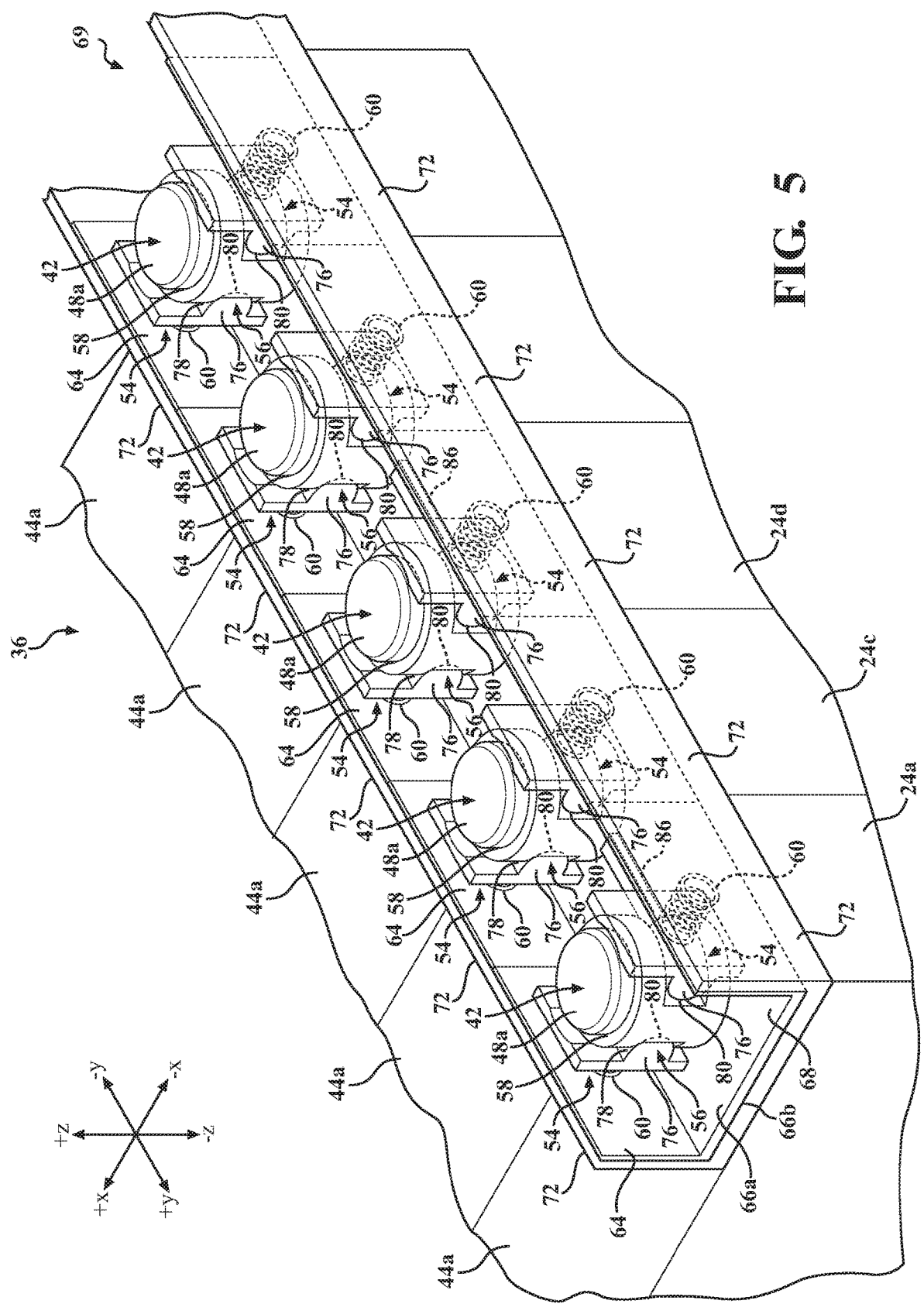
FIG. 5 schematically depicts a partial perspective view of the battery pack assembly of FIG. 1 with the first example plurality of terminal connector mechanisms in the engaged state according to one or more embodiments described herein.

Referring to FIGS. 4-5, the terminal connector mechanism 36 includes a housing 52, a pair of retention members 54, a terminal receiver 56, a terminal aperture 58, and a pair of biasing members 60. The housing 52 includes a base wall 62 and a pair of opposing sidewalls 64 extending outwardly from the base wall 62. The base wall 62 of the terminal connector mechanism 36 includes an interior surface 66a and an opposite exterior surface 66b. The terminal aperture 58 extends between the interior surface 66a and the exterior surface 66b of the base wall 62.

The base wall 62 of the terminal connector mechanism 36 further includes insulating portion 68 that is generally formed of an insulating material. In some embodiments, the insulating portion 68 includes a thermoplastic such as a polyetheretherkeytone (PEEK), a plastic such as polypropylene, polyvinyl chloride (PVC), Polybutylene Terephthalate (PET), and the like. It should be appreciated that, in some embodiments, the base wall may have a plurality of layers of the thermoplastic material, the plastic material, and the like, arranged in the vertical direction (i.e., in the +/−Z direction) with different materials between the layers, such as a conductive portion, as discussed in greater detail herein.

In some embodiments, the housing 52 further includes a housing reinforcement 69 that is positioned along the terminal surface 44a of the battery. The housing reinforcement 69 includes a support wall 70 and a pair of end walls 72 that extend from the support wall 70 to define a housing reinforcement area 74. It should be appreciated that in the engaged state, the pair of opposing sidewalls 64 and the base wall 62 may be positioned within the housing reinforcement area 74.

The pair of biasing members 60 are each independently positioned between the housing 52 and the respective retention member of the pair of retention members 54. In some embodiments, each of the pair of biasing members 60 are coupled to the respective sidewall 64 of the housing 52 and the respective retention member 54. In some embodiments, each of the pair of biasing members 60 are a spring such as tension springs, an elastomeric material, or other material configured to apply a biasing force to bias the respective retention member 54. In other embodiments, one of the pair of biasing members 60 is a spring and the other is a living hinge. The living hinge may be integrally formed as a one piece monolithic structure with the retention member 54 and the base wall 62. As such, the biasing member 60 may generally be a "V" shape. In other embodiments, both of the pair of biasing members 60 are living hinges.

The pair of retention members 54 are positioned between the terminal receiver 56 and the housing 52. Each of the pair of retention members 54 are configured to independently move between an engaged position and a disengaged position. That is, each retention member 54 is movable between the engaged position and the disengaged position. Further, each of the pair of retention members 54 includes a retention portion 76. The retention portion 76 is a shaped protrusion 78 that is dimensionally received by the terminal engagement portions 50 of the terminals 42 when the terminal connector mechanism 36 is in the engaged state and the corresponding retention member 54 is in the engaged position, as best shown in FIG. 5. That is, as discussed herein, each of the retention portions 76 is formed as a shape that corresponds to be received by a respective cutout 80 of the terminal receiver 56 and by the terminal engagement portion 50 of the terminal 42.

In some embodiments, the shaped protrusion 78 of the retention portion 76 is semicircular. In other embodiments, the shaped protrusion 78 of the retention portion 76 may be square, rectangular, hexagonal, and the like. Further, in some embodiments, the shaped protrusion 78 of the retention portion 76 may be angled to include a ramp surface, as discussed in greater detail herein.

In some embodiments, each one of the pair of retention members 54 are positioned between the terminal receiver 56 and one of the sidewalls 64. Each of the pair of biasing members 60 bias the respective retention member 54 towards the engaged position. As discussed herein, in the engaged position, the shaped protrusion 78 of the retention portion 76 of the retention member 54 engages with the terminal engagement portion 50 of the terminals 42 and the cutout 80 to inhibit movement of the terminal connector mechanism 36 with respect to an insertion direction, indicated by the arrow A1. Further, in the engaged position, the terminal receiver 56 is in a connected state, or communicatively coupled to the terminal engagement portion 50 of the terminals 42. As such, in the engaged position, each of the shaped protrusions 78 of the retention portions 76 are positioned closer to one another than when in the disengaged positon.

In the disengaged position, the shaped protrusion 78 of the retention portion 76 of the retention member 54 is disengaged from the terminal engagement portion 50 and spaced apart from the respective cutout 80, to permit movement of the terminal connector mechanism 36 with respect to the terminal 42 in the insertion direction A1, as best shown in FIG. 4. Further, in the disengaged position, the terminal receiver 56 is in a disconnected state, or is not communicatively coupled to the terminal engagement portion 50 of the terminals 42. As such, in the disengaged position, each of the shaped protrusions 78 of the retention portions 76 are positioned closer to the respective sidewall 64 than to one another than when in the engaged positon.

In some embodiments, the terminal aperture 58 may be formed in the base wall 62. The terminal aperture 58 may be configured to receive at least a portion of the terminal 42. As such, the terminal aperture 58 may be dimensionally shaped to correspond to the shape of the terminal 42. In some embodiments, the terminal aperture 58 is circular. In other embodiments, the terminal aperture 58 is non circular, such as rectangular, square, hexagonal and the like. As such, in some embodiments, the terminal aperture 58 may be a uniform shape and/or an irregular shape. In the engaged state, the terminal aperture 58 receives at least a portion of the terminal 42, as discussed in greater detail herein.

The terminal receiver 56 extends outwardly from the base wall 62 to at least partially surround the terminal aperture 58. The terminal received 56 has a shape that corresponds to the shape of the post 46 of the terminal 42. In some embodiments, the terminal receiver 56 is generally cylindrical with a terminal receiver diameter D3. As such, the terminal receiver 56 is configured to receive at least a portion of the terminal 42. In other embodiments, the terminal receiver 56 may be square, rectangular, hexagonal, octagonal, a combination thereof, and the like. Further, the terminal receiver 56 includes the at least one cutout 80. In the engaged position, the protrusion 78 of the retention portion 76 of the retention member 54 extends through the at least one cutout 80 of the terminal receiver 56 to engage with the terminal engagement portion 50 of the terminal 42, as best shown in FIG. 5.

In some embodiments, the at least one cutout 80 is a pair opposing cutouts positioned on opposite sides of the terminal receiver 56. In the engaged position, each protrusion 78 of the pair of retention portions 76 extend through respective cutouts 80 of the terminal receiver 56 to engage with the pair of terminal engagement portions 50 of the terminal 42, as best shown in FIG. 5. In some embodiments, each of the pair of cutouts 80 are generally a regular quadrilateral with one side open to permit the protrusion 78 to enter. In other embodiments, one or both of the pair of cutouts 80 are semicircular, rectangular, hexagonal, angled with a ramp surface, a combination thereof, and the like. As such, it should be appreciated that the pair of cutouts 80 may be a uniform shape or a non-uniform shape. It should also be appreciated that the pair of cutouts 80 reduce the terminal receiver diameter D3 to a cutout diameter D4, which is less than the terminal receiver D3.

The terminal receiver 56 of the terminal connector mechanism 36 includes an insulating portion 82 that is generally formed of an insulating material. In some embodiments, the insulating portion includes a thermoplastic such as a polyetheretherkeytone (PEEK), a plastic such as polypropylene, polyvinyl chloride (PVC), Polybutylene Terephthalate (PET), and the like. It should be appreciated that, in some embodiments, the terminal receiver 56 may have a plurality of layers of the thermoplastic material, the plastic material, and the like, arranged in the vertical direction (i.e., in the +/−Z direction) with different materials between the layers, such as conductive portions, as discussed in greater detail herein.

Still referring to FIGS. 4-5, each of the plurality of the terminal receivers 56 include a conductive collar 84. In some embodiments, the conductive collar 84 is communicatively coupled to the terminal 42 when the terminal connector mechanism is in the engaged state. In these embodiments, the conductive collar 84 may be positioned within the terminal aperture 58. In other embodiments, the conductive collar 84 may be positioned within at least one cutout 80. Further, the insulating portion 82 may abut the conductive collar 84. It should be understood that the conductive collar 84 provides a path for transmitting the energy stored within each of the plurality of battery cells 24 to the pair of load wires 38*a*, 38*b* for use by components of the vehicle 10 via a conductive path 86, as discussed in greater detail herein. As such, in some embodiments, each conductive collar 84 is a conductive metal material, such as silver (Ag), copper (Cu), gold (Au), aluminum (Al), beryllium (Be), calcium (Ca) magnesium (Mg), rhodium (Rh), sodium (Na), iridium (Ir), and/or the like.

Each conductive collar 84 is communicatively coupled to the conductive path 86, which extends through the terminal connector mechanism 36. In some embodiments, the conductive path 86 extends along a portion of the base wall 62 of the housing 52. In other embodiments, other portions of the housing 52 may include the conductive path 86. As such, it should be appreciated that the conductive path 86 is communicatively coupled to each conductive collar 84. That is, the conductive path 86 is configured to connect each of the conductive collars 84 to the pair of load wires 38*a*, 38*b*. As such, in some embodiments, the conductive path 86 is a conductive metal material, such as silver (Ag), copper (Cu), gold (Au), aluminum (Al), beryllium (Be), calcium (Ca) magnesium (Mg), rhodium (Rh), sodium (Na), iridium (Ir), and/or the like. As such, the energy flows from the plurality of battery cells 24 to the component through a path defined by the terminals 42, the conductive collar 84, the conductive path 86, and the pair of load wires 38*a*, 38*b*.

In some embodiments, the conductive path 86 is positioned between the interior surface 66*a* and the exterior surface 66b of the base wall 62. That is, the conductive path 86 extends through the base wall 62 of the housing 52 such that the conductive path 86 is sandwiched between insulating portions 68. As such, the conductive path 86 is electrically insulated from any component above or below, in front or behind, and on both sides of the terminal connector mechanism 36. The conductive path 86 includes portions that extend in the lateral direction (i.e., in the +/−X direction) and/or in the longitudinal direction (i.e., in the +/−Y direction) and has a thickness in the vertical direction (i.e., in the +/−Z direction).

In various embodiments, the conductive path 86 is configured to communicatively couple a positive polarity terminal from the battery cell 24a of the plurality of battery cells 24 to a negative polarity terminal of the adjacent battery cell 24c of the plurality of battery cells 24. The conductive path 86 of the other one of the other terminal connector mechanisms 36 is configured to communicatively couple a negative polarity terminal from the adjacent battery cell 24c of the plurality of battery cells 24 to a positive polarity terminal of a second adjacent battery cell 24d of the plurality of battery cells 24.

In other embodiments, the conductive path 86 of the terminal connector mechanism 36 is configured to communicatively couple a negative polarity terminal from the battery cell 24a of the plurality of battery cells 24 to a positive polarity terminal of the adjacent battery cell 24c of the plurality of battery cells 24. The conductive path 86 of another, or different terminal connector mechanism 36 is configured to communicatively couple a positive polarity terminal from the adjacent battery cell 24c of the plurality of battery cells 24 to a negative polarity terminal of a second adjacent battery cell 24d of the plurality of battery cells 24.

As such, it should be understood that the conductive path 86 completes or closes an electrical circuit between adjacent battery cells of the plurality of battery cells 24 such that the conductive paths 86 of the terminal connector mechanism 36 daisy chain, or electrically positions the plurality of battery cells 24 into a series configuration. That is, a plurality of the terminal connector mechanisms 36 together electrically position the plurality of battery cells 24 into a series configuration such that the energy stored in each battery cell of the plurality of battery cells 24 is maximized for transfer to other components of the vehicle 10. In some embodiments, the conductive path 86 may further include a continuous portion (not shown) that extends the length of the plurality of the terminal connector mechanisms 36 and which is communicatively coupled to the conductive path 86.

With reference to FIG. 4, in the disengaged position, the shaped protrusion 78 of the retention portion 76 of the retention member 54 is linearly displaced to disengage from the terminal engagement portion 50 such that shaped protrusion 78 is spaced apart from the terminal engagement portion 50 and from the respective cutout 80 of the terminal receiver 56 to permit movement of the terminal connector mechanism 36 with respect to the terminal 42 in the insertion direction A1. As such, in the disengaged position, an operator is permitted to move the terminal connector mechanism 36 into the disconnected state and subsequently remove the plurality of battery cells 24, as discussed in greater detail herein. It should be appreciated that, in some embodiments, to position the retention member 54 into the disengaged position, the operator may displace or spread the retention members 54 linearly, in the direction of arrows A3 and A4 respectively, towards the sidewalls 64 with a force greater than the bias applied by the pair of biasing members 60 on the respective retention member 54 towards the engaged position thereby removing the retention members 54 from within the terminal engagement portions 50 and the cutouts 80 such that the terminal connector mechanism 36 may be lifted vertically in an exit direction, illustrated with an arrow A2, from the engaged state into the disconnected state. The exit direction A2 is opposite of the insertion direction A1.

In other embodiments, the retention member 54 is positioned into the disengaged position when the operator uses an upward force in the exit direction A2 which mechanically spreads the retention members 54 towards the sidewalls 64 in the respective direction A3, A4 with a force greater than the bias applied by the pair of biasing members 60 on the respective retention member 54 towards the engaged position thereby removing the retention members 54 from within the terminal engagement portions 50 and the cutouts 80 such that the terminal connector mechanism 36 may continue to be lifted vertically in the exit direction A2 into the disconnected state.

With reference to FIG. 5, in the engaged state, each of the pair of biasing members 60 bias the respective retention member 54 towards the engaged position such that the retention portion 76 of the retention member 54 engages with the terminal engagement portion 50 of the terminals 42 to inhibit movement of the terminal connector mechanism 36 with respect to the insertion direction, indicated by the arrow A1. As such, in the engaged state with the retention members 54 in the engaged position, the terminal connector mechanism 36 retains the battery cell 24a into the battery pack assembly 20.

Now referring to FIG. 6, a second example terminal connector mechanism 136 is schematically depicted. It is understood that the terminal connector mechanism 136 is similar to the terminal connector mechanism 36 with the exceptions of the features described herein. As such, like features will use the same reference numerals with a prefix "1" for the reference numbers. As such, for brevity reasons, these features will not be described again.

As shown in FIG. 6, the pair of biasing members 160 are a spring clip to bias the retention member 154 into the engaged positon. Each of the pair of biasing members 160 extend from the respective sidewall 164 and the retention member 154. In some embodiments, each of the retention members 154 may be integrally formed as a one piece monolithic structure with the base wall 162. In this embodiment, each retention member 154 includes a living hinge 165 that couples the retention member 154 to the interior surface 166a of the base wall 162 to pivot the retention member 154 between the disengaged position and the engaged position about the living hinge 165, illustrated by the arrow A5, as shown in FIG. 6. As such, each retention member 154 may pivot or move about the living hinge 165 when the retention member 154 moves between the disengaged position and the engaged position.

As such, each of the pair of biasing members may generally be a "V" shape. It should be understood that the pair of biasing members 160 each apply a biasing force that biases the retention member 154 and the retention portion 176 into the respective cutout 180 and the respective terminal engagement portion 150 of the of the terminal 142. Further, the pair of biasing members 160 may bias the retention member 154 in the insertion direction A1.

Now referring to FIG. 7, a third example terminal connector mechanism 236 is schematically depicted. It is understood that the terminal connector mechanism 236 is similar to the terminal connector mechanism 36 with the exceptions of the features described herein. As such, like features will use the same reference numerals with a prefix "2" for the reference numbers. As such, for brevity reasons, these features will not be described again.

As shown in FIG. 7, the protrusions 278 of the retention portion 276 of the retention member 254 is an angled surface 290 or a ramp surface. As such, it should be understood that the angled surface 290 of the protrusion 278 permits the retention member 254 to easily be positioned into the disengaged position when the operator uses the upward force in the exit direction A2. As such, the angled surface 290 mechanically spreads the retention members 254 towards the sidewalls 264 in the respective direction A3, A4 with a force greater than the bias applied by the pair of biasing members 260 on the respective retention member 254 towards the engaged position thereby removing the retention members 254 from within the terminal engagement portions 250 and the cutouts 280 as the terminal connector mechanism 236 is lifted vertically in the exit direction A2.

Figure 8:
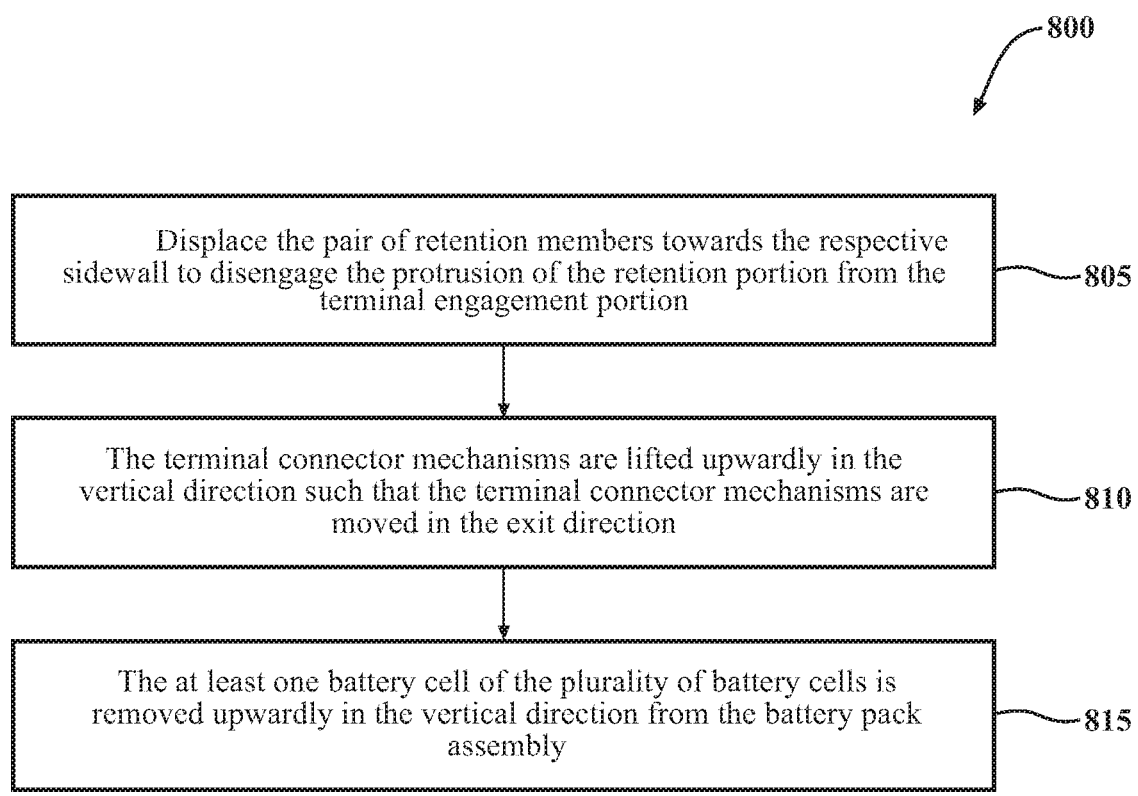
FIG. 8 depicts a flowchart of an illustrative method of removing a battery cell from a battery pack assembly of FIG. 1 according to one or more embodiments shown or described herein.

Now referring to FIG. 8, a flowchart of an illustrative method 800 of removing the battery cell from the battery pack assembly of FIG. 1 is depicted. The battery pack assembly is initially in an engaged state in which the terminal connector mechanism is in the engaged position such that the protrusions of the retention portion of the retention member are engaged with the terminal engagement portion of the terminal. At block 805, the operator manually spreads or displaces each of the pair of retention members towards the respective sidewall to disengage the protrusion of the retention portion from the terminal engagement portion. As a non-limiting example, one retention member is linearly displaced in a first direction and the other retention member is linearly displaced in a second, opposite direction such that the pair of retention members are neither electrically nor physically coupled to the terminals of plurality of battery cells.

At block 810, the terminal connector mechanisms are lifted upwardly in the vertical direction such that the terminal connector mechanisms are moved in the exit direction. As such, the terminal connector mechanisms are moved to the disconnected state in which the protrusion of the retention portion cannot engage with the terminal engagement portion. At block 815, at least one battery cell of the plurality of battery cells is removed upwardly in the vertical direction from the battery pack assembly.

The above described battery pack assembly provide for terminal connector mechanisms that electrically connect each of a plurality of battery cells to a vehicle component while retaining the plurality of battery cells within a housing. The terminal connector mechanisms are easily removed by linearly displacing a retention member in an opposite direction of a biasing force of a biasing member from an engaged position to a disengaged position. Once the retention member is disengaged from a terminal engagement portion of the terminal, the terminal connector mechanism may be removed providing access to the battery cell. The battery cell of the plurality of battery cells may be removed from the battery pack assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery pack assembly comprising:
at least one battery cell having at least one terminal, the at least one terminal having a terminal engagement portion;
a terminal connector mechanism having a housing, a retention member having retention portion, and a biasing member, the housing includes a pair of side walls extending outwardly from a base wall that traverses between the pair of side walls, and a terminal aperture formed in the base wall, the terminal aperture configured to receive the at least one terminal, the retention member configured to move between an engaged position and a disengaged position, the biasing member positioned between the pair of side walls of the housing and the retention member, the biasing member extends from one of the pair of side walls to bias the retention member towards the engaged position, in the engaged position the retention portion of the retention member engages with the terminal engagement portion to inhibit movement of the terminal connector mechanism with respect to the at least one terminal in an insertion direction, in the disengaged position, the retention portion of the retention member is disengaged from the terminal engagement portion to permit movement of the terminal connector mechanism with respect to the at least one terminal in the insertion direction.

2. The battery pack assembly of claim 1, wherein one of the terminal engagement portion and the retention portion is formed as a shaped recess and the other of the terminal engagement portion and the retention portion is formed as a shaped protrusion that has a shape that corresponds to the shape of the shaped recess.

3. The battery pack assembly of claim 2, wherein the housing includes a terminal receiver extending outwardly from the base wall to at least partially surround the terminal aperture, the terminal receiver is configured to receive at least a portion of the at least one terminal.

4. The battery pack assembly of claim 3, wherein the terminal receiver includes a cutout such that in the engaged position the retention portion of the retention member extends through the cutout of the terminal receiver to engage with the terminal engagement portion.

5. The battery pack assembly of claim 4, wherein the at least one terminal is an elongated post and the terminal connection portion is an elongated recess that extends generally normal to a longitudinal direction of the at least one terminal.

6. The battery pack assembly of claim 1, wherein the biasing member is a spring.

7. The battery pack assembly of claim 1, wherein the retention member is connected to the base wall by a living hinge integrally formed as a one piece monolithic structure with the retention member and the base wall.

8. The battery pack assembly of claim 1, wherein the at least one terminal includes a pair of terminal connector portions provided on opposite sides of the at least one terminal, the terminal connector mechanism includes a pair of retention members, and a pair of biasing members, the terminal aperture positioned between the pair of side walls.

9. The battery pack assembly of claim 8, wherein the housing includes a terminal receiver extending outwardly from the base wall to at least partially surround the terminal aperture, the terminal receiver is configured to receive at least a portion of the at least one terminal, the terminal receiver includes a pair of cutouts provided on opposite sides of the terminal receiver such that in the engaged position the retention portions of the pair of retention members extend through respective cutouts of the terminal receiver to engage with the pair of terminal engagement portions.

10. A vehicle comprising:
   at least one battery cell having at least one terminal, the at least one terminal having a terminal engagement portion;
   a terminal connector mechanism having a housing, a retention member having retention portion, and a biasing member, the housing includes a pair of side walls extending outwardly from a base wall that traverses between the pair of side walls, and a terminal aperture formed in the base wall, the terminal aperture configured to receive the at least one terminal, the retention member configured to move between an engaged position and a disengaged position, the biasing member positioned between the pair of side walls of the housing and the retention member, the biasing member extends from one of the pair of side walls to bias the retention member towards the engaged position, in the engaged position the retention portion of the retention member engages with the terminal engagement portion to inhibit movement of the terminal connector mechanism with respect to the at least one terminal in an insertion direction, in the disengaged position, the retention portion of the retention member is disengaged from the terminal engagement portion to permit movement of the terminal connector mechanism with respect to the at least one terminal in the insertion direction.

11. The vehicle of claim 10, wherein one of the terminal engagement portions and the retention portion is formed as a shaped recess and the other of the terminal engagement portion and the retention portion is formed as a shaped protrusion that has a shape that corresponds to the shape of the shaped recess.

12. The vehicle of claim 11, wherein the housing includes a terminal receiver extending outwardly from the base wall to at least partially surround the terminal aperture, the terminal receiver is configured to receive at least a portion of the at least one terminal.

13. The vehicle of claim 12, wherein the terminal receiver includes a cutout such that in the engaged position the retention portion of the retention member extends through the cutout of the terminal receiver to engage with the terminal engagement portion.

14. The vehicle of claim 12, wherein the at least one terminal is an elongated post and the terminal connection portion is an elongated recess that extends generally normal to a longitudinal direction of the at least one terminal.

15. The vehicle of claim 10, wherein the biasing member is a spring.

16. The vehicle of claim 10, wherein retention member is connected to the base wall by a living hinge integrally formed as a one piece monolithic structure with the retention member and the base wall.

17. A method of removing an individual battery cell from a battery pack having a plurality of battery cells, each battery cell having at least one terminal, the method comprising:
   displacing a first retention member towards a first sidewall and a second retention member towards a second sidewall of a terminal connector mechanism to disengage a protrusion of a retention portion of each of the first and second retention members from a terminal engagement portion of the at least one terminal;
   removing the terminal connector mechanism from the battery pack in a first direction; and
   removing the individual battery cell from the battery pack in the first direction.

18. The method of claim 17, wherein the first retention member is linearly displaced in a second direction and the second retention member is linearly displaced in a third direction, the second direction is opposite of the third direction.

* * * * *